US008483061B2

(12) United States Patent
Lerzer et al.

(10) Patent No.: US 8,483,061 B2
(45) Date of Patent: Jul. 9, 2013

(54) TECHNIQUE FOR PERFORMING LAYER 2 PROCESSING USING A DISTRIBUTED MEMORY ARCHITECTURE

(75) Inventors: Jürgen Lerzer, Neumarkt/OPf (DE); Stefan Meyer, Hoechstadt (DE); Stefan Strobl, Obermichelbach (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 445 days.

(21) Appl. No.: 12/768,254

(22) Filed: Apr. 27, 2010

(65) Prior Publication Data

US 2010/0325393 A1 Dec. 23, 2010

Related U.S. Application Data

(60) Provisional application No. 61/176,658, filed on May 8, 2009.

(30) Foreign Application Priority Data

Apr. 27, 2009 (EP) ..................................... 09005845

(51) Int. Cl.
*G06F 11/00* (2006.01)
(52) U.S. Cl.
USPC ..... 370/235; 370/310.2; 370/394; 370/395.7; 370/428; 455/422.1; 710/13; 711/5; 711/115; 714/18; 714/748
(58) Field of Classification Search
USPC ............... 370/235, 235.1, 236, 236.1, 236.2, 370/237, 238, 238.1, 310.2, 328–339, 349, 370/394, 395.7, 395.71, 395.72, 428, 429; 455/422.1; 714/18, 748–751; 710/13; 711/5, 711/115
See application file for complete search history.

(56) References Cited

U.S. PATENT DOCUMENTS

| 5,768,533 A * | 6/1998 | Ran .................................. 709/247 |
| 2001/0032325 A1* | 10/2001 | Fong et al. ....................... 714/18 |
| 2005/0021874 A1* | 1/2005 | Georgiou et al. ............. 709/250 |
| 2005/0114574 A1* | 5/2005 | Okamoto et al. ................ 710/74 |
| 2007/0140123 A1* | 6/2007 | Fukui ............................. 370/235 |
| 2007/0280158 A1* | 12/2007 | Qiu et al. ........................ 370/329 |
| 2010/0070695 A1* | 3/2010 | Baek et al. ..................... 711/104 |
| 2010/0158161 A1* | 6/2010 | Sambhwani et al. .......... 375/341 |

* cited by examiner

*Primary Examiner* — Hoon J Chung (57) ABSTRACT

A distributed memory architecture for a layer 2 processing circuit chip (50) is described. In one implementation, the layer 2 processing circuit chip (50) comprises an external memory interface configured to provide access to data packets stored in an external memory (52), a layer 2 processor (54) coupled to the external memory interface (56) and configured to process data packets retrieved from the external memory (56) to generate RLC SDUs, and an on-chip memory (58) coupled to the layer 2 processor (54) and configured to store the RLC PDUs generated by the layer 2 processor (54) prior to their transmission. Upon a request to retransmit an RLC PDU, the layer 2 processor (54) is configured to selectively read the RLC PDU to be retransmitted from the on-chip memory (58) or a data packet comprising the RLC PDU to be retransmitted from the external memory (52). In the latter case, the layer 2 processor (54) is further configured to re-generate the RLC PDU to be retransmitted from the data packet read from the external memory (52). The selectivity of the read operation depends on whether or not the RLC PDU to be retransmitted belongs to a data packet that has been completely transmitted in a single layer 1 transport unit.

12 Claims, 8 Drawing Sheets

IN A CIPHERING MODE, RETRIEVE VIA THE EXTERNAL MEMORY INTERFACE DATA PACKETS FROM THE EXTERNAL MEMORY, CIPHER THE DATA PACKETS, AND STORE THE CIPHERED DATA PACKETS IN A TRANSMISSION BUFFER OF THE ON-CHIP MEMORY — 602

IN A DECIPHERING MODE, READ CIPHERED DATA PACKETS FROM A RECEPTION BUFFER OF THE ON-CHIP MEMORY, DECIPHER THE CIPHERED DATA PACKETS, AND PASSING THE DECIPHERED DATA PACKETS TO THE EXTERNAL MEMORY INTERFACE FOR BEING STORED IN THE EXTERNAL MEMORY — 604

TECHNIQUE FOR PERFORMING LAYER 2 PROCESSING USING A DISTRIBUTED MEMORY ARCHITECTURE

This application claims the benefit of U.S. Provisional Application No. 61/176,658, filed May 8, 2009, the disclosure of which is fully incorporated herein by reference.

TECHNICAL FIELD

The present disclosure generally relates to radio interface processing. In particular, the disclosure is directed to performing layer 2 processing using distributed memories.

TECHNICAL BACKGROUND

In mobile communication networks, the radio interface comprises layers 1 and 2 of the Open System Interconnection (OSI) reference model. Layer 1 is also called physical layer, while layer 2 is sometimes referred to as link layer. Mapping between transport channels and physical channels, spreading and modulation operations, power control and handover mechanisms are typical layer 1 functions. Layer 2 functions, on the other hand, provide the means to transfer data between network entities and to detect (and possibly correct) errors that may occur in layer 1.

In the specifications of modern Radio Access Networks (RANs), such as the Universal Mobile Telecommunication Services (UMTS) Terrestrial RAN (UTRAN) and its Long-Term Evolution (LTE) extension, layer 2 is split into several sub-layers. Each sub25 layer is defined by a dedicated radio interface protocol, including the Medium Access Control (MAC) protocol, the Radio Link Control (RLC) protocol and the Packet Data Convergence Protocol (PDCP). In brief, MAC processing includes mapping between logical channels and transport channels and error correction, RLC processing provides segmentation, concatenation and retransmission services, and PDCP processing comprises compression operations and access stratum 30 security procedures.

Figure 1:
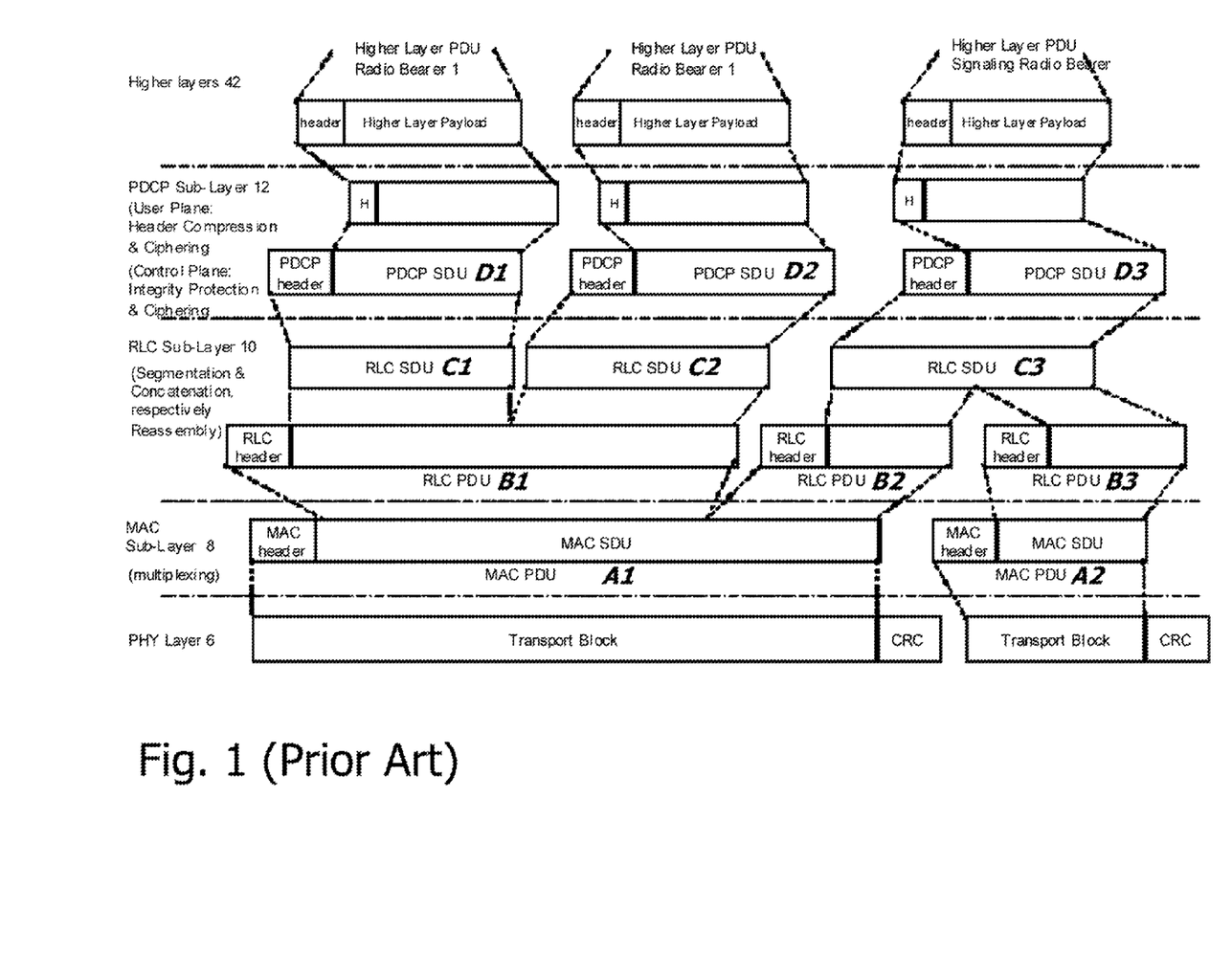

Radio interface processing in an exemplary LTE-compliant network entity having a layered protocol stack as shown in FIG. 1 will now be discussed in more detail for the downlink direction in a receiving entity (such as a mobile terminal). In a first step, layer 1 functions ("PHY" layer 6 in FIG. 1) recover 0, 1 or more LTE Transport Blocks (TBs) per Transmission Time Interval (TTI) from the physical channels and deliver the recovered TBs via their associated transport channels to a MAC sub-layer 8. Functions on the MAC sub-layer 8 de-multiplex the transport channels and construct RLC Protocol Data Units (PDUs) from the received TBs. The RLC PDUs are then delivered from the MAC sub-layer 8 to an RLC sub-layer 10 on their associated logical channels, such as the Dedicated Control Channel (DCCH) and the Dedicated Traffic Channel (DTCH).

Figure 2:
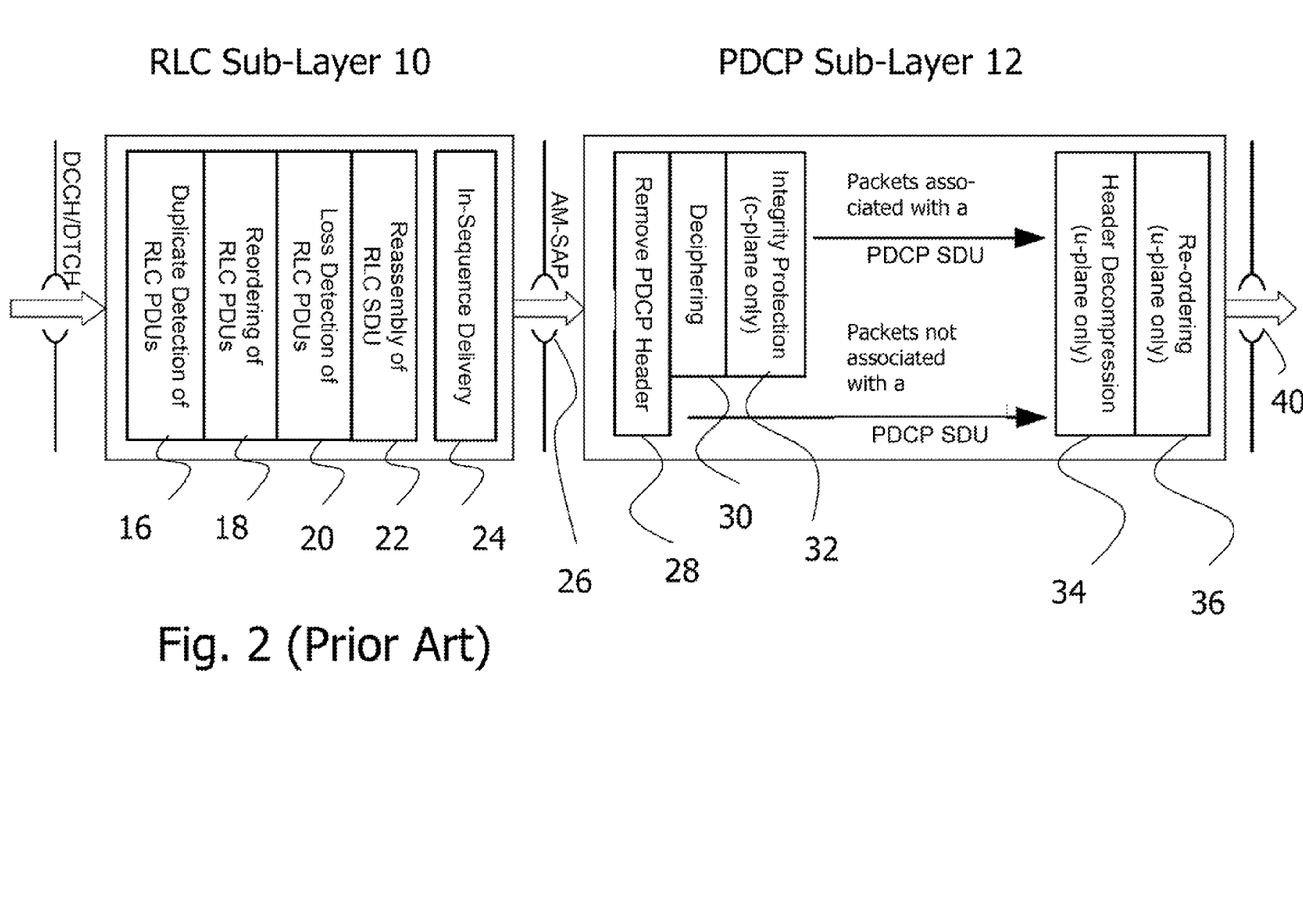
FIG. 2 is a schematic diagram illustrating processing functions of an RLC sub-layer and a PDCP sub-layer.

FIG. 2 illustrates the processing operations performed on the RLC sub-layer 10 and on an PDCP sub-layer 12 of FIG. 1 upon receipt of the RLC PDUs via the DCCH/DTCH in the Acknowledged Mode (AM) of the RLC sub-layer 10. The RLC sub-layer 10 and the PDCP sub-layer 12 belong to a layer 2 processing system of the LTE-compliant network entity.

On the RLC sub-layer 10, the RLC PDUs are received by a function 16 in charge of detecting (and discarding) duplicates of the received RLC PDUs before storing them in a reception and reordering buffer (not shown in FIG. 2). After a reordering function 18 of the RLC sub-layer 10 has reordered the buffered RLC PDUs, a loss detection function 20 analyses the reordered RLC PDUs to detect if any RLC PDU is missing. In the case of a missing RLC PDU, a reordering timer is started, and a STATUS Control PDU indicating the one or more missing RLC PDUs is sent in the uplink to trigger a retransmission.

The in-sequence RLC PDUs are moved from the reception and reordering buffer to a reassembly function 22. The reassembly function 22 processes the buffered in-sequence RLC PDUs to reassemble RLC Service Data Units (SDUs). A delivery function 24 then reads the reassembled RLC SDUs from the reassembly buffer and delivers them in sequence via an AM Service Access Point (AM-SAP) interface 26 to the PDCP sub-layer 12 as illustrated in FIG. 2.

On the PDCP sub-layer 12, the in-sequence RLC SDUs are received by a header removal function 28 in charge of removing the PDCP header from each RLC SDU to recover a PDCP SDU if possible. The following functions performed on the PDCP sub-layer 12 depend on whether or not the higher layer data packets are in fact associated with PDCP SDUs. In case PDCP SDUs can be recovered from the RLC PDUs, the PDCP SDUs are in a first step deciphered by a ciphering function 30 and then (in case of control plane processing only) subjected to an integrity protection operation performed by an integrity protection function 32.

The data packets corresponding to the deciphered user plane PDCP SDUs as well as the user plane data packets not associated with PDCP SDUs are then sent to an decompression function 34 for a decompression of the data packet headers. A subsequent reordering function 36 delivers the data packets with decompressed headers via a PDCP SAP interface 40 to higher protocol layers 42.

In the exemplary LTE scenario illustrated in FIGS. 1 and 2, the layer 2 functions generally have to complete their processing operation triggered in one TTI (of 1 ms) within 1 ms. Assuming an RLC receiving window size of for example 32 ms, it may happen that one RLC SDU is still missing while all RLC SDUs of the next 31 TTIs have already been received. As the delivery function 24 of the RLC sub-layer 10 is configured to deliver the RLC SDUs in sequence to the PDCP sub-layer 12, the 31 RLC SDUs already received are delivered to the PDCP sub-layer 12 only when the single missing RLC SDU is received (or when the RLC reordering window is outdated upon expiry of a timer). In such a case, all RLC SDUs received within the last 32 ms will have to be processed by the PDCP functions within the predefined processing window of 1 ms. Because of the resulting processing peak, the system architecture has to be designed with sufficient hardware resources.

As an example, the ciphering function 30 must have the capability of deciphering 3.2 Gbit/s for an average downlink data rate of 100 Mbit/s. A layer 2 processor executing the ciphering function 30 will thus have to be over-dimensioned from the viewpoint of the average ciphering load. Needless to say that the resulting over-dimensioning significantly adds to the hardware cost of the layer 2 processing system.

Figure 3:
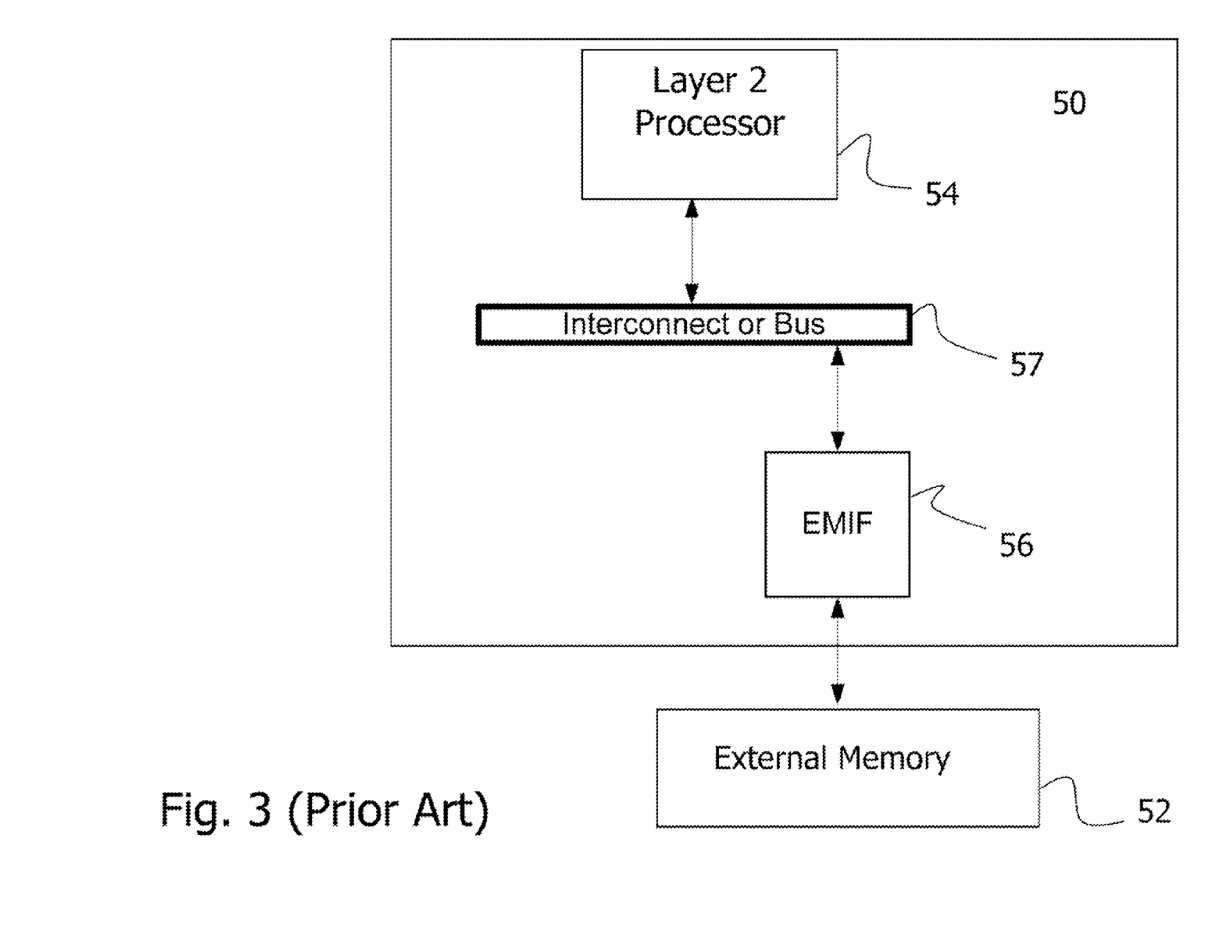
FIG. 3 is a schematic block diagram of a layer 2 processing system comprising an external memory.

The above processing scenario also necessitates an over-dimensioning of an interface between the layer 2 processor and a memory for storing the layer 2 data. For an average downlink data rate of 100 Mbit/s, the memory interface needs in an exemplary deployment the capability of handling a peak data rate of 9.6 Gbit/s within 1 ms. Such a high peak data rate is particularly costly to achieve in a system architecture relying on an external memory. FIG. 3 illustrates such an architecture of a layer 2 processing system comprising a circuit chip 50 and an external memory 52 coupled to a layer 2 processor 54 on the circuit chip 50 via an External Memory Interface (EMIF) 56.

In the exemplary architecture illustrated in FIG. 3, the layer 2 processor 54 accesses the EMIF 56 via an interconnect or bus 57, to which further processing components requiring access to the external memory 52 may be connected. Compared to internal memory interfaces, the EMIF 56 with the capability of handling a peak data rate of 9.6 Gbit/s is much costlier. On the other hand, the apparently obvious solution of replacing the external memory 52 with an on-chip memory is likewise costly for typical memory sizes of several Mbytes.

SUMMARY

Accordingly, a more efficient memory architecture is needed for performing layer 2 processing.

According to a first aspect, a method of performing layer 2 processing on a circuit chip is provided. The method comprises retrieving data packets from a memory external to the circuit chip for transmission, processing the retrieved data packets by a layer 2 processor to generate RLC PDUs, storing the RLC PDUs prior to their transmission in an on-chip memory co-located with the layer 2 processor on the circuit chip, and, upon a request to retransmit an RLC PDU, selectively reading the RLC PDU to be retransmitted from the on-chip memory, or a data packet comprising the RLC PDU to be retransmitted from the external memory and re-generating the RLC PDU to retransmitted from the data packet read from the external memory, wherein the selectivity is dependent on whether or not the RLC PDU to be retransmitted belongs to a data packet that has been completely transmitted in a single layer 1 transport unit.

In one implementation, a retransmission from the external memory is initiated if the RLC PDU to be retransmitted has been sent in a first transport unit and belongs to an RLC SDU comprising at least one further RLC PDU that has been sent in a second transport unit. Moreover, a retransmission from the on-chip memory may be initiated if the RLC PDU belongs to an RLC SDU that has been completely transmitted in a single transport unit. This retransmission approach may also be inverted by initiating a retransmission from the external memory if the RLC PDU to be transmitted belongs to an RLC SDU that has been completely transmitted in a single transport unit, while a retransmission from the on-chip memory is initiated if the RLC PDU to be retransmitted has been sent in a first transport unit and belongs to an RLC SDU comprising at least one further RLC PDU that has been sent in a second transport unit.

The step of re-generating the RLC PDU to be retransmitted may comprise applying at least one of a PDCP function and an RLC function to the data packet read from the external memory. For example, at least one of a ciphering function (e.g., of the RLC sub-layer or the PDCP sub-layer), an RLC header generation function and a PDCP header generation function may be applied to the data packet read from the external memory.

At least an initial transmission (and in certain situations also the retransmission) of the RLC PDUs may be performed from the on-chip memory (e.g., from a transmission buffer partition of the on-chip memory). Each RLC PDU may be purged from the on-chip memory without waiting for an acknowledgment from a recipient if the RLC PDU belongs to an RLC SDU that has been completely transmitted in a single transport unit. On the other hand, each RLC PDU may be kept in the on-chip memory at least until a positive acknowledgment from a recipient is received if the RLC PDU has been sent in a first transport unit and belongs to an RLC SDU comprising at least one further RLC PDU that has been sent in a second transport unit.

According to another aspect, a method of performing layer 2 processing on a circuit chip comprising a layer 2 processor configured to apply a ciphering function, an on-chip memory co-located with the layer 2 processor on the circuit chip and accessible by the layer 2 processor, and an external memory interface configured to couple the layer 2 processor to an external memory is provided. The method comprises, in a ciphering mode, retrieving via the external memory interface data packets from the external memory, ciphering the data packets, and storing the ciphered data packets in a transmission buffer of the on-chip memory. In a deciphering mode, the method comprises reading ciphered data packets from a reception buffer of the on-chip memory, deciphering the ciphered data packets, and passing the deciphered data packets to the external memory interface for being stored in the external memory.

The retrieving and storing of the data packets may be performed via Direct Memory Access (DMA). Moreover, the ciphering function may belong to PDCP sub-layer processing. Alternatively, the ciphering function may belong to RLC sub-layer processing. In one implementation, at least one of a MAC header and an RLC header is generated for an individual data packet before subjecting the data packet to the PDCP ciphering function.

The circuit chip may further comprise a layer 1 processing sub-system capable of reading the ciphered data packets from the transmission buffer and writing the ciphered data packets into the reception buffer. Arranging the layer 1 processing sub-system, the transmission buffer and the layer 2 processor on a single circuit chip significantly reduces layer 2 processing latency as well as usage of the external memory interface.

According to another aspect, a computer program product is provided. The computer program product comprises program code portions for performing the steps of one or more of the method aspects described herein when the computer program product is executed on one or more computing devices. The computer program product may be stored on a computer-readable recording medium such as a permanent or re-writeable memory, a CD-ROM, or a DVD. The computer program product may also be provided for download via one or more computer networks, such as the Internet, a mobile communication network or a wireless or wired Local Area Network (LAN).

According to a further aspect, a layer 2 processing circuit chip is provided. The layer 2 processing circuit chip comprises an external memory interface configured to provide access to data packets stored in the external memory, a layer 2 processor coupled to the external memory interface and configured to process data packets retrieved from the external memory to generate RLC PDUs, and an on-chip memory coupled to the layer 2 processor and configured to store the RLC PDUs generated by the layer 2 processor prior to their transmission. Upon a request to retransmit an RLC PDU, the layer 2 processor is configured to selectively read the RLC PDU to be retransmitted from the on-chip memory, or a data packet comprising the RLC PDU to be retransmitted from the external memory and to re-generate the RLC PDU to be retransmitted from the data packet read from the external memory. The selectivity may be dependent on whether or not the RLC PDU to be retransmitted belongs to a data packet that has been completely transmitted in a single layer 1 transport unit.

The layer 2 processor may further be configured to initiate a retransmission from the on-chip memory if the RLC PDU to be retransmitted has been sent in a first transport unit and belongs to an RLC SDU comprising at least one further RLC PDU that has been sent in a second transport unit and/or initiate a retransmission from the external memory if the first RLC PDU belongs to an RLC SDU that has been completely transmitted in a single transport unit.

A processing system may comprise the layer 2 processing circuit chip as well as the external memory. The processing system may be part of a mobile terminal such as a mobile telephone, a laptop, a data or network card, and so on.

According to a still further aspect, a layer 2 processing circuit chip is provided that comprises a layer 2 processor configured to apply a ciphering function, an on-chip memory co-located with layer 2 processor on the circuit chip and accessible by the layer 2 processor, and an external memory interface configured to couple the layer 2 processor to an external memory, and wherein the layer 2 processor is operable in a ciphering mode to retrieve via the external memory interface data packets from the external memory, cipher the data packets, and store the ciphered data packets in a transmission buffer of the on-chip memory. In a deciphering mode, the layer 2 processor is operable to read ciphered data packets from a transmission buffer of the on-chip memory, decipher the ciphered data packets, and pass the deciphered data packets to the external memory interface for being stored in the external memory.

The layer 2 processing circuit chip may further comprise a layer 1 processing sub-system configured to read the ciphered data packets from the transmission buffer and to write the ciphered data packets into the reception buffer. The ciphering function may be realized by a hardware accelerator. The circuit chip may be part of a processing system (included, e.g., in a mobile terminal) comprising the layer 2 processing circuit chip as well as the external memory.

BRIEF DESCRIPTION OF THE DRAWINGS

In the following, the present technique will be described in more detail with reference to exemplary embodiments illustrated in the drawings, wherein FIG. 1 schematically illustrates the radio interface protocol stack for the uplink and downlink of an LTE-enabled network entity.

DETAILED DESCRIPTION

In the following description, for purposes of explanation and not limitation, specific details are set forth, such as specific device configurations and specific layer 2 processing scenarios in order to provide a thorough understanding of the technique disclosed herein. It will be apparent to one skilled in the art that the technique may be practiced in other embodiments that depart from these specific details. Moreover, while the following embodiments will primarily be described in relation to UMTS and its LTE extension, it will be readily apparent that the techniques described herein may also be practiced in context with other communication networks. Furthermore, while in the following reference will be made to specific RLC and PDCP functions, the techniques discussed herein can also be implemented using other RLC and PDCP functions.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the technique disclosed herein may also be embodied in a computer processor and a memory coupled to the processor, wherein the memory stores one or more programs that perform the steps discussed herein when executed by the processor.

Figure 4:
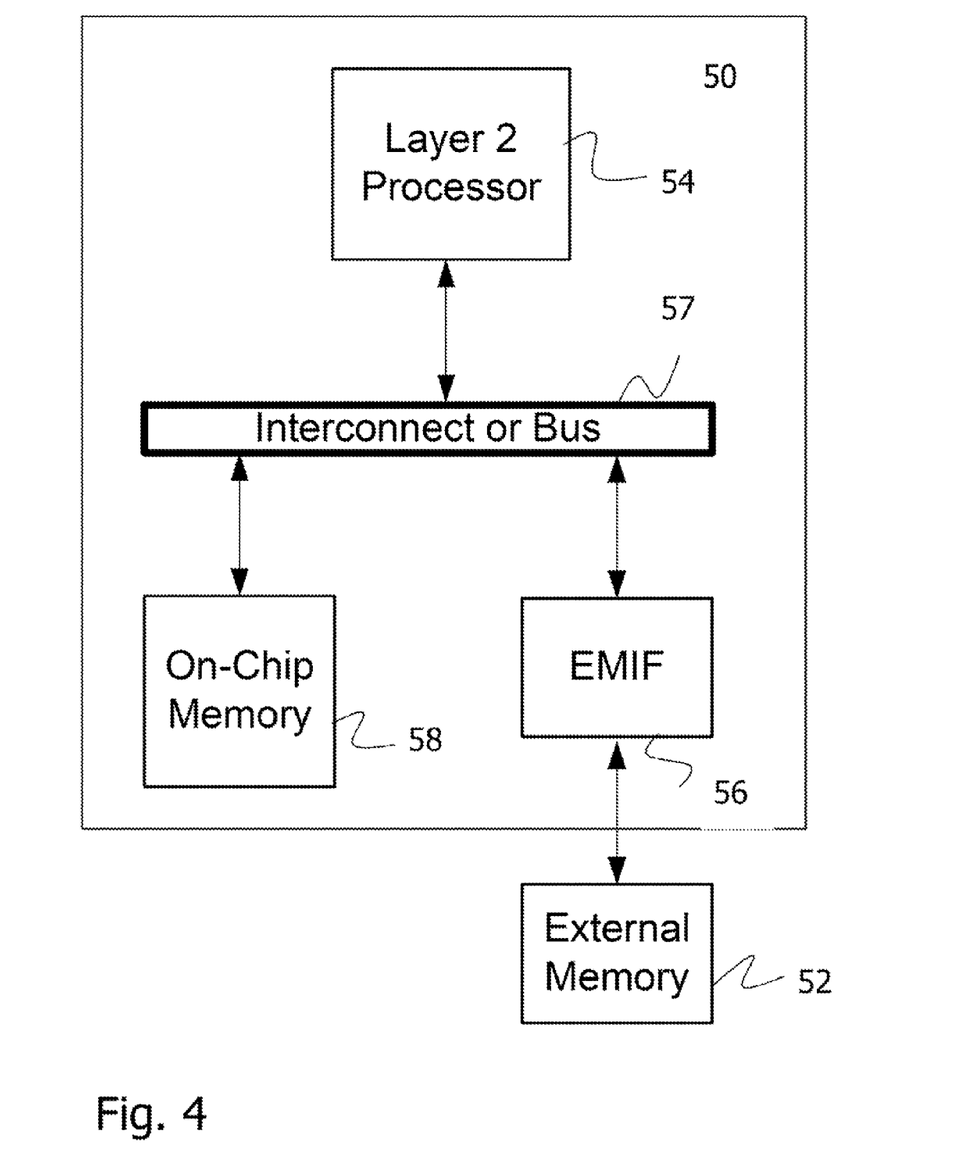
FIG. 4 shows a block diagram of an embodiment of a layer 2 processing system.

FIG. 4 shows an embodiment of a layer 2 processing system that has been derived from the system illustrated in FIG. 3. The same reference numerals as in FIG. 3 will therefore be used to designate the same or similar components.

In the system architecture illustrated in FIG. 4, an on-chip memory 58 of a circuit chip 50 is coupled to an interconnect or bus 57 in addition to an external memory 52. The external memory 52 is accessible from the circuit chip 50 via an EMIF 56. While the on-chip memory 58 is optional, it allows to reduce the usage of the EMIF 58 by a layer 2 processor 54. As a result, the EMIF 56 can be down-sized in relation to the supported peak data rate as will be discussed in more detail below.

The layer 2 processor 54 is configured to implement, inter alia, a ARQ-based re-transmission scheme on the RLC sub-layer 10 for transmissions that have been failed. Additionally, the layer 2 processor 54 provides ciphering and deciphering services on the PDCP sub-layer 12. The operation of the layer 2 processor 54 shown in FIG. 4 will now be described with reference to the exemplary protocol stack of FIG. 1 and flow charts 500 and 600 of FIGS. 5 and 6, respectively.

Figure 5:
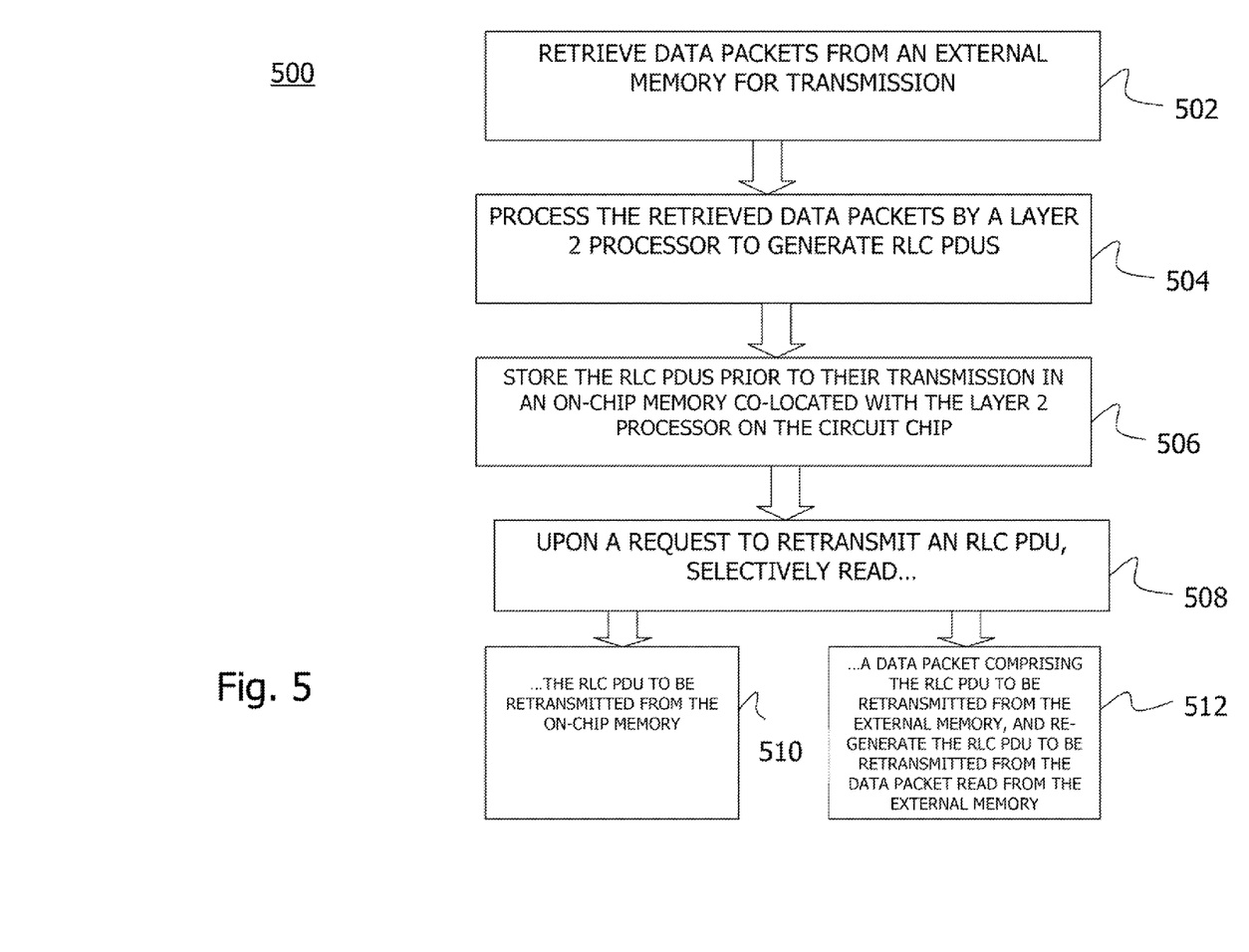
FIG. 5 is a schematic flow chart illustrating a method embodiment.

Flow chart 500 illustrates a method embodiment of the retransmission operations performed by the layer 2 processor 54 in relation to an uplink data flow in a transmitting entity (such as a mobile terminal). In a first step 502, the layer 2 processor 54 retrieves, via the EMIF 56, data packets from the external memory 52. The data packets may have been placed in the external memory 52 by higher layer functions as illustrated in FIG. 1. Then, in a next step 504, the layer 2 processor 54 processes the retrieved data packets to generate RLC PDUs. The processing of the retrieved data packets may involve one or more PDCP functions as well as one or more RLC functions (e.g., as illustrated in FIG. 2).

In step 506, the RLC PDUs thus generated are stored in the on-chip memory 58 co-located with the layer processor 54 on the circuit chip 50. The RLC PDUs may, for example, be stored in a transmission buffer partition of the on-chip memory 58. The buffered RLC PDUs may then be retrieved from the on-chip memory 58 by a layer 1 processing sub-system before being transmitted to a recipient.

In case a specific RLC PDU is not correctly received by the recipient, a retransmission of this RLC will be requested in step 508. The retransmission can either be explicitly requested by the recipient or a request may be triggered locally by determining that the recipient has not positively acknowledged receipt of a specific RLC PDU.

The retransmission operation triggered by the retransmission request depends on whether or not the RLC PDU to be retransmitted belongs to a data packet that has been completely transmitted in a single layer 1 transport unit (e.g., in a single TB). Depending on whether the data packet associated with the RLC PDU to be retransmitted has been transmitted as a whole or in the form of several fragments, the RLC PDU to be retransmitted may be read from the on-chip memory 58 as indicated by step 510. Alternatively, as indicated by step 512, the retransmission of the requested RLC PDU may be performed as follows. In a first sub-step, the layer 2 processor 54 reads a data packet comprising the RLC PDU to be retransmitted from the external memory 52. Then, in a next sub-step the layer 2 processor 54 re-generates the RLC PDU to be retransmitted from the data packet read from the external memory 52. Regardless of how the RLC PDU to be retransmitted has been obtained (i.e., read from the on-chip memory 58 or re-generated from a data packet in the external memory 52), it will finally be resent as is generally known in the art.

The approach of selectively re-generating RLC PDUs to be retransmitted from the corresponding data packets in the external memory 52 allows to keep the size of the on-chip memory 58 small as, in certain configurations, those RLC PDUs to be re-generated from data packets in the external memory need not remain buffered in the transmission buffer until a successful receipt can be determined. Rather, such RLC PDUs may be deleted immediately upon being retrieved by the layer 1 processing sub-system.

In one implementation, a retransmission from the on-chip memory 58 is initiated if the RLC PDU to be retransmitted has been sent in a first transport unit and belongs to an RLC SDU comprising at least one further RLC PDU that has been sent in a second transport unit. In the example of FIG. 1, RLC PDU B2 belongs to RLC SDU C3, which additionally comprises RLC PDU B3. RLC PDUs B2 and B3 will be transmitted via different MAC PDUs A1 and A2 and also via different TBs. For this reason, RLC PDUs B2 and B3 may remain in the on-chip memory 58 until it was determined that both RLC PDUs B2 and B3 have successfully been received by the recipient.

On the other hand, a retransmission from the external memory 52 may be initiated if the RLC PDU to be retransmitted belongs to an RLC SDU that has been completely transmitted in a single transport unit. Referring again to the example of FIG. 1, RLC PDU B1 belongs to RLC SDUs C1 and C2, and both RLC SDUs C1 and C2 are transmitted via a single MAC SDU A1 and a single TBs. For this reason RLC PDU B1 will be purged from the transmission buffer immediately upon being read by the layer 1 processing sub-system. Should a retransmission of RLC PDU B1 be requested, RLC PDU B1 has to be re-generated from the higher layer data packets corresponding to PDCP SDUs D1 and D2.

It should be noted that FIG. 1 is in general not illustrative of any temporal relationship regarding reception or transmission of individual PDUs and individual SDUs. For this reason the specific numbering (such as RLC PDU B1, RLC PDU B2, etc.) is not necessarily indicative of any order in which a specific PDU or SDU is received or transmitted.

Figure 6:
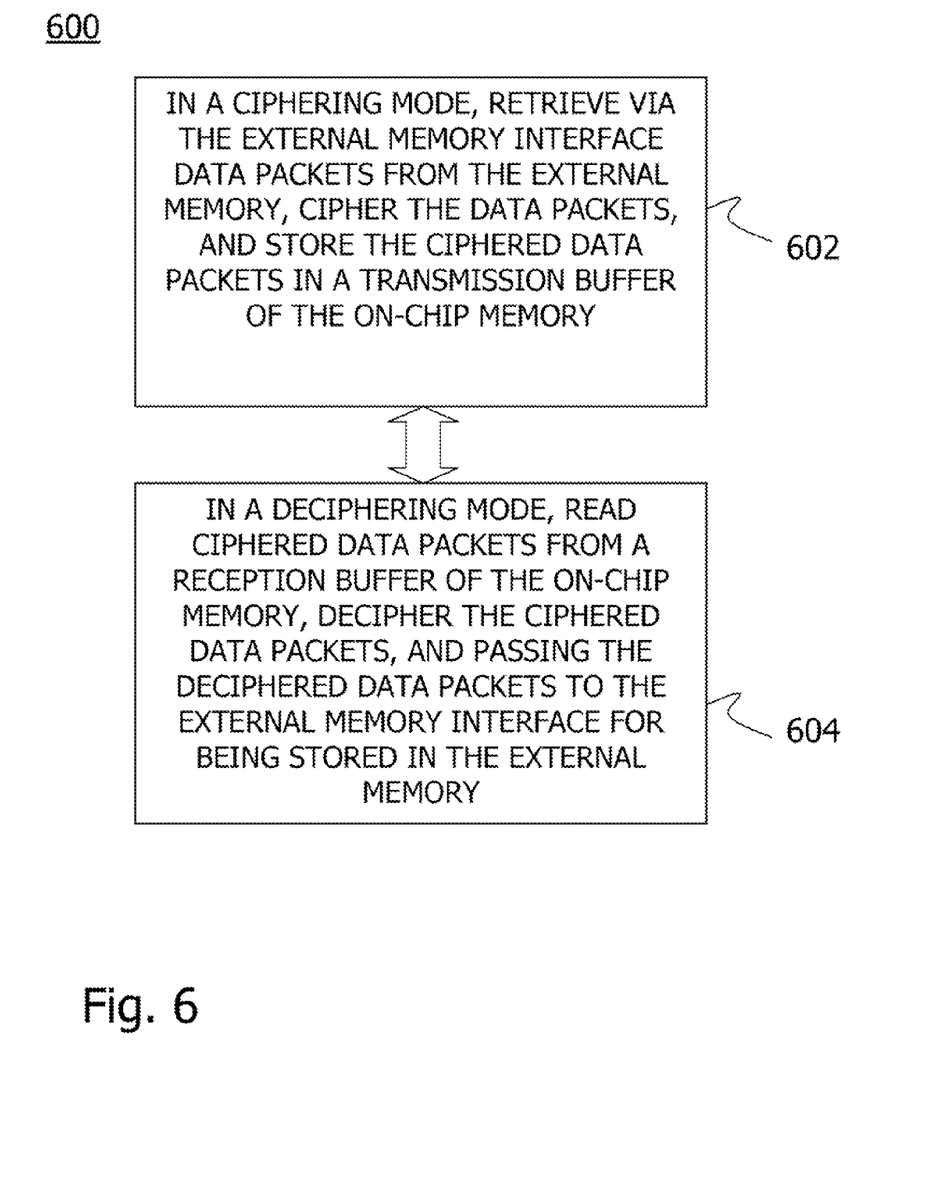
FIG. 6 is a schematic flow chart illustrating a further method embodiment.

The distributed memories 52 and 58 may not only be employed in the retransmission context discussed above, but also in a ciphering context. In this regard, flow chart 600 illustrates a method embodiment of the ciphering operations applied by the layer 2 processor 54 to uplink and downlink data flows.

Step 602 illustrates the operations applied the layer 2 processor 54 to an uplink data flow in a ciphering mode. In the ciphering mode, the layer 2 processor 54 first retrieves via the EMIF 56 data packets from the external memory 52. The data packets are then subjected to a ciphering function and the resulting ciphered data packets are stored in a transmission buffer of the on-chip memory. From the on-chip memory, the ciphered data packets may be read (e.g., in the form of MAC PDUs) by a layer 1 processing sub-system for being transmitted on the uplink.

Step 604 illustrates the operations applied by the layer 2 processor 54 to a downlink data flow. In the illustrated deciphering mode, the layer 2 processor 54 first reads ciphered data packets (e.g., in the form of RLC SDUs) from a reception buffer partition of the on-chip memory 58. Then, the ciphered data packets are deciphered and the deciphered data packets are passed to the EMIF 52 for being stored in the external memory 52.

The approach of having the reception and transmission buffers co-located with the ciphering/deciphering layer 2 processor 54 on a single circuit chip 50 advantageously reduces the data transfer via the EMIF 56 (compared to the system architecture illustrated in FIG. 3). Consequently, usage of the EMIF 56 is reduced and the corresponding higher requirements are relaxed.

Figure 7:
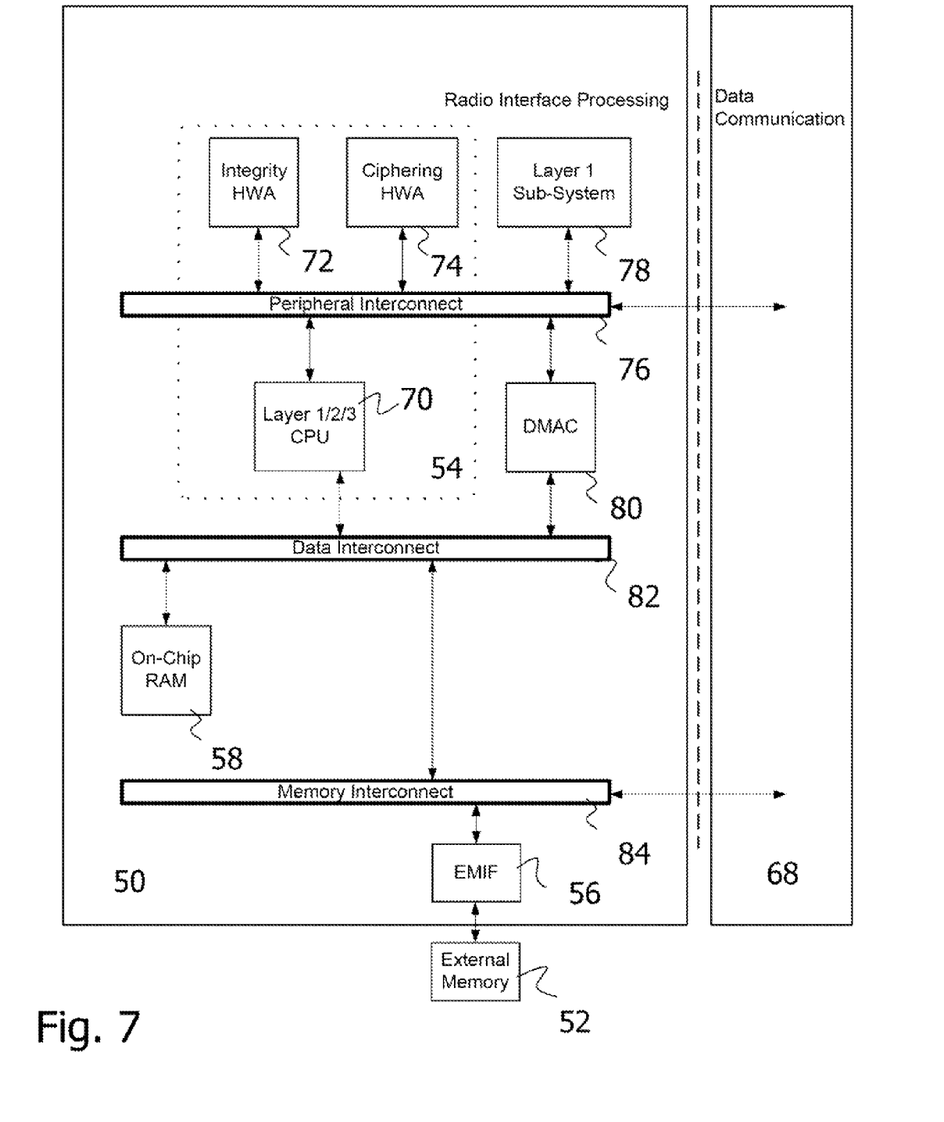
FIG. 7 is a schematic block diagram illustrating an embodiment of a network entity comprising a layer 2 processing system.

In the following, a more detailed embodiment of a layer 2 processing system will be described with reference to FIG. 7. FIG. 7 illustrates the hardware architecture of a circuit chip 50 in the form of an exemplary LTE radio interface processing ASIC. The radio interface processing ASIC 50 is coupled to another circuit chip 68 (in the form of another ASIC) providing data communication functions. Such functions may, for example, comprise interface functionalities to an external device such as a stationary or mobile computer (e.g., to a laptop or to a Personal Computer). In an alternative embodiment, the circuit chip 50 and the circuit chip 68 could be implemented as sub-systems within a single ASIC.

The radio interface processing ASIC 50 is based on the hardware architecture discussed above in context with FIG. 4, and for this reason the same reference numerals are used to designate the same or similar components. The core component of the ASIC 50 is a processor 54 comprising a Central Processing Unit (CPU) executing layer is 1, layer 2 as well as layer 3 software functions, a first hardware accelerator 72 performing PDCP integrity protection as well as a second hardware accelerator 74 performing PDCP-based ciphering (including deciphering) functions. The CPU 70 as well as the two hardware accelerators 72, 74 are connected to a peripheral interconnect or bus 76. Also connected to the peripheral interconnect or bus 76 are a layer 1 sub-system 78 with hardware accelerators for layer 1 processing as well as a Direct Memory Access Controller (DMAC) 80 for a direct data transfer (bypassing the CPU 70) between memories and the hardware accelerators 72, 74, 78.

The CPU 70 as well as the DMAC 80 are additionally connected to a data interconnect or bus 82. Also connected to the data interconnect or bus 82 are an on-chip Random Access Memory (RAM) 58 having a size of approximately 0.3 to 2 Mbyte as well as a memory interconnect or bus 84. The memory interconnect or bus 84 essentially corresponds to the interconnect or bus 57 of FIG. 4 and provides access to an external memory 52 via an EMIF 56. The external memory 52 could be a flash memory, a RAM (e.g., an SDRAM), or a combination thereof with a size of approximately 1 to 10 Mbyte.

As illustrated in FIG. 7, the peripheral interconnect or bus 76 may be connected to a corresponding peripheral interconnect or bus (not shown) of the data communication side or shared with the data communication side. The same applies for the memory interconnect or bus 84.

Figure 8:
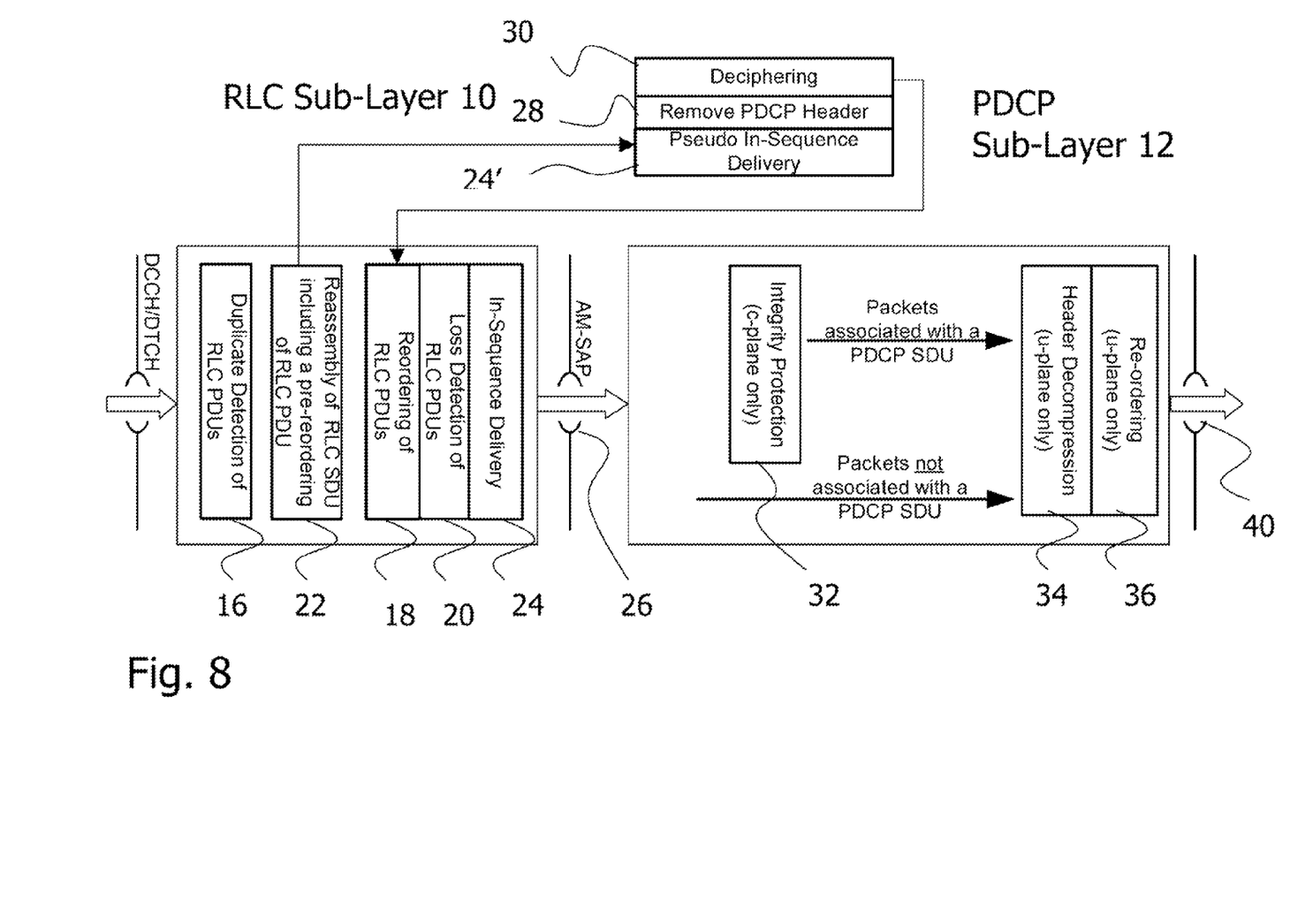
FIG. 8 schematically illustrates an embodiment of re-arranged layer 2 processing functions.

In the following, the LTE layer 1/layer 2 downlink user data flow in the system architecture illustrated in FIG. 7 will be described with additional reference to FIGS. 1 and 8. FIG. 8 illustrates the modified layer 2 functions compared to the scenario discussed above with reference to FIG. 2. In FIG. 8, the same reference numerals as in FIG. 2 are used to denote the same or similar functions.

The downlink processing starts with Radio Frequency (RF) data arriving in the layer 1 sub-system 78. The layer 1 sub-system 78 converts the RF data to a downlink data stream of 100 Mbit/s with a TB size of two times 50.000 bits (for each TTI of 1 ms) for an exemplary LTE User Equipment (UE) of category 3 (CAT3). The layer 1 sub-system 78 then creates an interrupt notifying the CPU 70 that there is uplink control data and, optionally, uplink user data to be transmitted. The uplink control data may include acknowledgment information (Ack/Nack) for the uplink HARQ mechanism and other information. The interrupt to the CPU 70 also includes a notification that there now are downlink TBs ready to be processed by layer 2 functions. The interrupt is sent once for each TTI.

Responsive to the interrupt, the CPU 70 fetches and analysis the MAC and RLC headers for the newly received downlink TBs at a rate of approximately 1 to 2 Mbit/s (or roughly 1000 to 2000 bits per TTI). After having read the header parameters, the CPU 70 programs the DMAC 80 to shuffle the complete TBs (i.e., the MAC PDUs as shown in FIG. 1) from the layer 1 sub-system 78 to the on-chip RAM 58. This process is performed once every TTI. In response to being programmed by the CPU 70, the DMAC 80 transfers the newly received TBs from the layer 1 sub-system 78 to the on-chip RAM 58 at a rate of 100 Mbit/s (or 100 kbit per TTI). In the on-chip RAM 58, the TBs are temporarily stored in a reception buffer partition (not shown in FIG. 7).

Once the MAC PDUs have been transferred to the on-chip RAM 58, the CPU 70 applies the required MAC functions to the buffered MAC PDUs to remove the MAC headers, to demultiplex the received transport channels and to recover the RLC PDUs contained therein. The resulting RLC PDUs are then delivered to the RLC sub-layer 10 via the DCCH/DTCH as illustrated in FIG. 8. It should be noted that the RLC PDUs are delivered to the RLC sub-layer 10 with a zero-copy approach. This means that the removal of the MAC header and the demultiplexing in the MAC sub-layer is done by only manipulating pointers (i.e., without copying the RLC PDUs between different memory partitions within or outside the on-chip RAM 58).

On the RLC sub-layer 10, the RLC PDUs are first subjected to a duplicate detection function 16 as shown in FIG. 8 to identify and discard any RLC PDU duplicates. Then, a modified reassembly function 22 analyses each RLC PDU to determine if the RLC PDU contains a complete RLC SDU or if the RLC PDU at least contains an RLC SDU fragment which can be combined with one or more further RLC SDU fragments already buffered in the on-chip RAM 58 to complete an RLC SDU. In the exemplary scenario depicted in FIG. 1, the RLC PDU B1 contains two complete RLC SDUs C1 and C2. As a further example, RLC SDU C3 can be completed immediately upon receipt of RLC PDU B3 in case RLC PDU B2 is already buffered in the on-chip RAM 58.

In order to enable the reassembly of RLC SDUs, the reassembly function 22 is configured to do a pre-reordering of RLC PDUs. This pre-reordering may take into account that individual RLC PDUs have not yet been received from the MAC sub-layer.

It should be noted that the reassembly function 22 may be programmed such that each RLC PDU that contains one or more complete RLC SDUs (such as RLC PDU B1 in FIG. 1) is not transferred into the buffer of the on-chip RAM 58. Moreover, in case a buffered RLC PDU (such as RLC PDU B2 in FIG. 1) is needed to form a complete RLC SDU, this RLC PDU is immediately purged from the buffer once the RLC SDU has been created. Furthermore, the RLC PDU (such as RLC PDU B3 in FIG. 1) completing the RLC SDU will also not be transferred into the buffer if it can be combined with one or more already buffered RLC PDUs. As a result of this buffering concept, the on-chip RAM 58 may be kept small. As used in the present context, the term buffering is understood to designate the storing of a specific data item (such as an RLC SDU or an RLC PDU) for more than one TTI. If, on the other hand, the data item is stored for only up to one TTI, this storage does not qualify as buffering (even if the data item is at least partially stored in a memory area formally designated as buffer).

As shown in FIG. 8, all RLC SDUs which have been reassembled in a specific TTI (typically 8 or 9 packets of 1500 byte at a data rate of 100 Mbit/s) are delivered "pseudo in-sequence" by a new RLC function 24' to initial PDCP processing (PDCP functions 28 and 30). Pseudo in-sequence delivery means that if there are RLC SDUs missing which normally would have to be delivered to the PDCP sub-layer 12 before the one or more RLC SDUs that could be completed during a specific TTI, the delivery function 24' indicates the sequence order of the completed RLC SDUs delivered to the following PDCP functions 28, 30. As order information, the number of missing RLC SDUs between two delivered RLC SDUs may be indicated. The corresponding order information enables the PDCP functions 28, 30 to correctly perform their processing tasks. As an example, PDCP deciphering requires calculation of the PDCP hyperframe number on the PDCP sub-layer 12. This calculation depends on the sequence order of the RLC SDUs. Therefore, gaps in the sequence order of the RLC SDUs delivered pseudo in-sequence to the PDCP sub-layer 12 have to be indicated.

The RLC SDUs completed in a specific TTI within the on-chip RAM 58 are subjected to PDCP processing in the same TTI. Specifically, the CPU 70 processes and removes the PDCP header (header removal function 28 in FIG. 8) and generates the corresponding IP data packets by creating within the on-chip RAM 58 the appropriate linked list referencing the constituting PDCP SDU fragments. The linked list allows to retrieve the PDCP SDU fragments from the on-chip RAM 58 for a subsequent deciphering by ciphering function 30.

After removal of the PDCP header and creation of the linked list, deciphering is initiated. To this end, the CPU 70 programs the DMAC 80 to perform a double DMA. A first DMA transfers the bits of each PDCP SDU in the right order from the on-chip RAM 58 to the ciphering hardware accelerator 74. The ciphering hardware accelerator 74 applies the ciphering function 30 to the received PDCP SDUs and transfers the deciphered bits via a second DMA (and via the EMIF 56) to the external memory 52. Transfer of the PDCP SDUs to the ciphering hardware accelerator 74 as well as transfer of the deciphered IP data packets to the EMIF 56 are performed at a rate of approximately two times 100 Mbit/s (or two times 100 kbit per TTI).

After the ciphering function 30 has been applied, RLC processing of the deciphered IP data packets (corresponding to PDCP SDUs) continues with performing a reordering function 18. Accordingly, in contrast to the RLC processing chain illustrated in FIG. 2, in the embodiment shown in FIG. 8 RLC reassembly, PDCP header removal and PDCP deciphering are performed before RLC reordering for such RLC SDUs which have been completed in the analyzed TTI. After the RLC PDUs have been reordered based on an RLC receiving or reordering window of a specific size (e.g., as described in Sections 5.1.2.2 and 5.1.3.2 of 3GPP TS 36.3222 V 8.5.0), a loss detection function 20 is executed to detect any missing RLC PDUs and trigger their retransmission. The retransmission mechanism is performed in a conventional manner.

It is important to note that the RLC reordering function 18 as well as the RLC loss detection function 20 are applied both to the incomplete RLC SDUs as stored in the reception buffer of the on-chip RAM 58 and to the deciphered IP data packets stored in the external memory 52. To this end, an association between the buffered RLC PDUs (e.g. based on their sequence numbers as contained in the RLC PDU headers) and of the deciphered IP data packets (e.g., based on the corresponding sequence numbers of their PDCP headers) indicative of their sequence order will be established. The association can be stored in a table managed by the CPU 70.

The association is also useful in case an RLC PDU contains one or more complete RLC SDUs that may immediately be subjected to the PDCP functions 28 and 30 plus one or more RLC SDU fragments (so that the complete RLC PDU needs to be kept in the reception buffer until the remaining RLC SDU fragments become available). As long as the RLC processing of such an RLC PDU is not yet finished, the association between the buffered RLC PDU and its already PDCP-processed RLC SDUs (IP data packets) is maintained. The RLC PDU itself is purged from the buffer after the reordering function 18 has been successfully completed for this RLC PDU. In general, the association between the buffered RLC PDUs and the deciphered IP data packets is only deleted after the loss detection function 20 has successfully been performed.

After completion of the reordering and loss detection functions 18, 20, the deciphered IP data packets in the external memory 52 are released in-sequence by a delivery component 24 and via the AM-SAP interface 26 to the remaining processing functions on the PDCP sub-layer 12. These remaining PDCP functions include an integrity protection function 32 performed by the hardware accelerator 72, a header decompression function 34 as well as a reordering function 36 as explained above with reference to FIG. 2.

Once PDCP processing is finished, the CPU 70 informs a data communication CPU (not shown) of the data communication ASIC 68 that one or more IP data packets are available in the external memory 52 to be processed by higher layer functions. To this end, a handshake mechanism between the CPU 70 of the radio interface processing ASIC 50 and the data communication ASIC 68 is implemented to notify the data communication CPU accordingly. Upon receiving a corresponding notification signal, the data communication CPU initiates the required data communication functions. Such data communication functions may comprise reading the IP data packets from the external memory 52 and transferring them via a Universal Serial Bus (USB) or other interface to another device.

It should be noted that the layer 2 downlink processing described above is not restricted to LTE-based processing and to the RLC AM. Rather, the downlink processing concept may also be applied in the context of other mobile communication standards as well as in the Unacknowledged Mode (UM) of RLC. The layer 2 processing approach discussed herein is particularly useful for the RLC UM in case of larger RLC reordering window sizes.

Moreover, in case of other mobile communication standards or in case ciphering/deciphering is disabled, the pseudo in-sequence delivery from the RLC sub-layer 10 to the PDCP functions (such as to the header removal function 28 of FIG. 8) might not be needed as the processing on the PDCP sub-layer 12 may be independent of any specific sequence order.

Still further, the integrity protection function 32 (only for the control plane) and the header decompression function 34 (optional for the user plane) as well as the delivery of the resulting IP data packets to higher layers have been described as being performed after the RLC reordering and loss detection functions 18, 20 have been applied to the deciphered IP data packets. At least the integrity protection function 32 (and optionally the header decompression function 34) could also be performed before the RLC reordering and loss detection functions 18, 20. In such a case, only the PDCP reordering function 36 would be applied to the IP data packets received via the AM-SAP interface 26 before delivery of the IP data packets via the interface 40 to the higher layer functions.

The approach of performing one or more PDCP functions before performing the final RLC function has the advantage that the downlink data flow can be more evenly distributed over several TTIs. As a result, over-dimensioning of the hardware involved in the layer 2 processing and data transfer operations can be avoided. Additionally, layer 2 processing gets essentially independent from an RLC window size as all complete RLC SDUs can be processed immediately (i.e., without waiting for the reception of one or more missing RLC PDUs to complete the RLC SDU set defined by the RLC reordering window).

It is expected that the technique presented herein allows to reduce (at an average downlink data rate of 100 Mbit/s and for an RLC reordering window size of 32 ms) the required deciphering capabilities to 200 Mbit/s. Additionally, the data transfer capabilities of the EMIF 56 can be reduced to handling a peak data rate of only 600 Mbit/s within 1 ms. This assumption is based on a worst-case-scenario, in which each received RLC PDU contains an RLC SDU fragment, the remaining RLC SDU fragment has already been received, and both fragments to build the complete RLC SDU have approximately the same size.

Having thus described the downlink user data flow with reference to FIG. 8, the uplink user data flow (at an exemplary data rate of 50 Mbit/s) will now be explained. In this regard, reference will again be made to the system architecture depicted in FIG. 7 and an exemplary LTE scenario.

Initially, the CPU of the data communication ASIC 68 informs the CPU 70 of the radio interface processing ASIC 50 that one or more IP data packets stored in the external memory 52 need to be transmitted on the uplink. To this end, a handshake mechanism is implemented between the CPU 70 and its counterpart on the data communication ASIC 68 to inform the CPU 70 about the data ready for transmission. Upon receipt of a corresponding handshake signal, the CPU 70 reads information about the data to be transmitted, such as the number of packets to be transmitted and their packet lengths. It will be assumed here that the handshake signal is received once every 4 ms.

The CPU 70 then essentially performs the opposite layer 2 processing steps as explained above with reference to FIGS. 2 and 8. Specifically, the CPU 70 starts with performing a first PDCP function to compress the IP headers (Robust Header Compression, RoHC) of the received IP data packets at a rate of approximately 1.5 Mbit/s. In a next step the CPU 70 generates within the on-chip RAM 58 the PDCP headers for the IP data packets (still stored in the external memory 52). Additionally, the RLC sub-layer 10 is informed about the PDCP PDUs that are to be transmitted (at a rate of approximately 0.1 Mbit/s).

Trigged by an interrupt from the layer 1 sub-system 78 as described above, the CPU 70 then generates the MAC and RLC headers for the data to be transmitted and stores the headers in the on-chip RAM 58 at a rate of 0.5 to 1 Mbit/s (or roughly 500 to 1000 bits per TTI). In a next step, the IP data packets as stored by the data communication ASIC 68 in the external memory 52 are transferred to the ciphering hardware accelerator 74 to generate the ciphered PDCP SDUs to be transmitted in the next TTI. The ciphered PDCP SDUs will be stored in a transmission buffer partition of the on-chip RAM 58. It is important to note that the MAC and RLC processing is performed before the PDCP-based ciphering function is applied by the ciphering hardware accelerator 74.

The transfer of the bits of the IP data packets from the external memory 52 via the ciphering hardware accelerator 74 to the on-chip RAM 58 will now be described in more detail. It should be noted that this transfer will be the same for each initial transmission (and each subsequent retransmission of non-fragmented PDCP SDUs). In a first step, CPU 70 creates the appropriate linked list indicative of the received IP data packets that were already subjected to IP header compression. Then, the CPU 70 programs the DMAC 80 to perform a double DMA. A first DMA transfers the bits of the IP data packets in the right order from the external memory 52 to the ciphering hardware accelerator 74. After the ciphering function has been applied, the ciphered bits are transferred via a second DMA into the transmission buffer partition of the on-chip RAM 58 for being transmitted. The transfer of IP data packets from the external memory 52 to the ciphering hardware accelerator 74 and of the ciphered PDCP SDUs to the transmission buffer in the on-chip RAM 58 is performed at a rate of two times 50 Mbit/s (corresponding to 2×50 kbit per TTI of 1 ms).

For the initial transmission and each retransmission, the CPU 70 is configured to generate the uplink TBs by creating the appropriate linked list containing the MAC headers, RLC headers, PDCP headers (completely or partially) and the ciphered PDCP SDUs (completely or partially). The CPU 70 then programs the DMAC 78 to transfer the TBs from the transmission buffer of the on-chip RAM 58 to a layer 1 common memory of the layer 1 sub-system 78. An RLC PDU belonging to a PDCP SDU transmitted in a single TB is immediately removed from the transmission buffer. An RLC PDU corresponding to a fragmented PDCP SDU (i.e., an PDCP SDU that is transmitted via different TBs), on the other hand, is kept in the transmission buffer portion until reception of the corresponding RLC PDUs is positively acknowledged by the RLC of the recipient, such as an eNode B. The transfer of TBs from the on-chip RAM 58 to the layer 1 sub-system 78 is performed at a rate of 50 Mbit/s (corresponding to 50 kbit per TTI).

An interrupt from the CPU 70 to the layer 1 sub-system 78 notifies the layer 1 sub-system 80 that one or more TBs are ready for transmission. The layer 1 sub-system 80 then converts the TBs to RF data and transmits the RF data to the recipient. These processes occur once per TTI. Then, the CPU 70 checks the RLC retransmission window and removes the IP data packets (non-fragmented PDCP SDUs) from the external memory 52 as well as the RLC PDUs corresponding to fragmented PDCP SDUs from the on-chip RAM 58 which fall out of the RLC transmission window.

As mentioned above, RLC PDUs corresponding to fragmented PDCP SDUs are kept in the transmission buffer until reception of the corresponding RLC PDUs is positively acknowledged by the receiving network entity. While the RLC PDUs of non-fragmented PDCP SDUs are also transmitted from the on-chip RAM 58, any subsequent retransmission requires reading the original PDCP SDUs again from the external memory 52, performing the ciphering (and, if needed, further PDCP/RLC) functions, and placing the re-generated RLC PDU again in the transmission buffer of the on-chip RAM 58 for retransmission. After the retransmission, the corresponding RLC PDU is again immediately purged without waiting for a possible acknowledgment, and so on.

In the example shown in FIG. 1, PDCP SDUs D1 and D2 are not fragmented as they will be transmitted via the single RLC PDU B1 in a single TB. For this reason, RLC PDU B1 will be purged from the transmission buffer of the on-chip RAM 58 immediately after transmission and without waiting for the receipt of RLC PDU B1 being positively acknowledged by the receiving network entity. In the case of a failed transmission, RLC PDU B1 is re-generated from the associated PDCP SDUs D1 and D2 stored in the external memory 52. The re-generation will involve, for example, a re-ciphering. The retransmission scenario is different for PDCP SDU D3, which will be transmitted in the form of two PDCP SDU fragments via RLC PDU B2 on the one hand and RLC PDU B3 on the other (and via two TBs). For this reason, the RLC PDUs B2 and B3 remain in the transmission buffer until a positive acknowledgment response is received.

As explained above, non-fragmented PDCP SDUs are retransmitted from the external memory 52, whereas PDCP SDU fragments are retransmitted from the transmission buffer. This retransmission strategy has been selected in the present embodiment as the ciphering function performed by the hardware accelerator 74 operates on complete PDCP SDUs. While in principle the retransmission scenario could also be inverted by retransmitting fragmented PDCP SDUs from the external memory 52 and the non-fragmented PDCP SDUs from the transmission buffer, such an approach might unnecessarily cipher successfully retransmitted PDCP SDU fragments of such PDCP SDUs that need to be re-transmitted only partially. Moreover, it is estimated that only approximately 5 to 20% for PDCP SDUs are fragmented, which means that the transmission buffer in the typically more costly on-chip memory 58 can be kept small compared to the size of the external memory 52.

By distributing the data storage in the context of layer 2 processing between an on-chip memory 58 on the one hand and an external memory 52 on the other, the usage of the EMIF 56 can be significantly reduced. One reason for this reduction in the above embodiments is the fact that data transfers between the layer 1 sub-system 78 to the ciphering hardware accelerator 74 and vice versa are kept within the radio interface processing ASIC 50.

As on-chip memories are generally rather costly, it is desirable to reduce the size of the on-chip memory 58 as far as possible. The sophisticated buffering and retransmission mechanisms described above, which synergistically rely on the memory resources available on-chip and externally, help to keep the required size of the on-chip memory 58 as small as possible.

It is expected that EMIF usage in the above embodiments can be decreased by 30% and more. As a result, the risk of having the EMIF 56 as bottleneck for achieving the high data rates requires for LTE and similar high-performance systems is reduced. Additionally, the reduced EMIF usage allows to exploit unused capacities of the EMIF 56 for other, parallel functionalities (e.g., for applications residing on the data communication ASIC 68 accessing the EMIF 56).

As a further advantageous result, layer 2 processing latency is reduced because data transfers to and from the on-chip memory 58 are much faster compared to the data transfers to the external memory 52 via the EMIF 56. Due to the reduced usage of the EMIF 56, the power consumption of the radio interface processing ASIC 50 is reduced also. The reduced processing latency and lower power consumption can be exploited to run additional functions or applications on the CPU 70.

In the foregoing, principles, embodiments and various modes of implementing the technique disclosed herein have exemplarily been described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method of performing layer 2 processing on a circuit chip, the method comprising:
   retrieving data packets from an external memory to the circuit chip for transmission;
   processing the data packets by a layer 2 processor to generate Radio Link Control (RLC) Protocol Data Units (PDUs),
   storing the RLC PDUs prior to transmission in an on-chip memory co-located with the layer 2 processor on the circuit chip;
   upon a request to retransmit an RLC PDU, selectively reading:
      i. the RLC PDU to be retransmitted from the on-chip memory; or
      ii. a data packet comprising the RLC PDU to be retransmitted from the external memory and re-generating the RLC PDU to be retransmitted from the data packet read from the external memory,
   dependent on whether or not the RLC PDU to be retransmitted belongs to a data packet that has been completely transmitted in a single layer 1 transport unit. and
   initiating a retransmission of the RLC PDU from at least one of:
      i. the on-chi memo if the RLC PDU to be retransmitted has been sent in a first layer 1 transport unit and belongs to an RLC Service Data Unit (SDU) comprising at least one further RLC PDU that has been sent in a second layer 1 transport unit, and
      ii. from the external memory if the RLC PDU to be retransmitted belongs to an RLC SDU that has been completely transmitted in the single layer 1 transport unit.

2. The method of claim 1,
   wherein initiating the retransmission in response to a request for the retransmission or an absence of an acknowledgement of receipt of the RLC PDU.

3. The method of claim 1, wherein re-generating the RLC PDU to be retransmitted comprises applying at least one of a Packet Data Convergence Protocol (PDCP) function and an RLC function to the data packet read from the external memory.

4. The method of claim 1, wherein re-generating the RLC PDU to be retransmitted comprises applying at least one of a ciphering function, an RLC header generation function and a Packet Data Convergence Protocol (PDCP) header generation function to the data packet read from the external memory.

5. The method of claim 1, wherein at least an initial transmission of the RLC PDUS is performed from the on-chip memory.

6. The method of claim 5, further comprising purging each RLC PDU from the on-chip memory without waiting for an acknowledgement from a recipient if the RLC PDU belongs to the RLC SDU that has been completely transmitted in a single layer 1 transport unit.

7. The method of claim 5, further comprising keeping each RLC PDU in the on-chip memory at least until an acknowledgement from a recipient is received if the RLC PDU has been sent in the first layer 1 transport unit and belongs to the RLC SDU comprising at least one further RLC PDU that has been sent in the second layer 1 transport unit.

8. A computer program product comprising program code stored in a non-transitory computer readable medium configured to:
   retrieve data packets from an external memory to a circuit chip for transmission;
   process the data packets by a layer 2 processor to generate Radio Link Control (RLC) Protocol Data Units (PDUs);
   store the RLC PDUs prior to transmission in an on-chip memory co-located with the layer 2 processor on the circuit chip;
   upon a request to retransmit an RLC PDU, selectively read;
      i. the RLC PDU to be retransmitted from the on-chip memory; or
      ii. a data packet comprising the RLC PDU to be retransmitted from the external memory and re-generate the RLC PDU to be retransmitted from the data packet read from the external memory,
   dependent on whether or not the RLC PDU to be retransmitted belongs to a data packet that has been completely transmitted in a single layer 1 transport unit, and
   initiate a retransmission of the RLC PDU from at least one of:
      i. the on-chip memory if the RLC PDU to be retransmitted has been sent in a first layer 1 transport unit and belongs to an RLC Service Data Unit (SDU) comprising at least one further RLC PDU that has been sent in a second layer 1 transport unit, and
      ii. from the external memory if the RLC PDU to be retransmitted belongs to an RLC SDU that has been completely transmitted in the single layer 1 transport unit.

9. The computer program product of claim 8, wherein the program code stored in the computer readable medium is further configured to re-generate the RLC PDU to be retransmitted by applying at least one of a ciphering function, an RLC header generation function and a Packet Data Convergence Protocol PDCP header generation function to the data packet read from the external memory.

10. A layer 2 processing circuit chip comprising:
   an external memory interface configured to provide access to data packets stored in an external memory;
   a layer 2 processor coupled to the external memory interface and configured to process data packets retrieved from the external memory to generate Radio Link Control (RLC) Protocol Data Units (PDUs);
   an on-chip memory coupled to the layer 2 processor and configured to store the RLC PDUs generated by the layer 2 processor prior to transmission;
   upon a request to retransmit an RLC PDU, the layer 2 processor is configured to selectively read
      i. the RLC PDU to be retransmitted from the on-chip memory; or
      ii. a data packet comprising the RLC PDU to be retransmitted from the external memory, wherein the layer 2 processor is further configured to re-generate the RLC PDU to be re-transmitted from the data packet read from the external memory, dependent on whether or not the RLC PDU to be retransmitted belongs to a data packet that has been completely transmitted in a single layer 1 transport unit, and initiate a retransmission of the RLC PDU by the layer 2 processor from at least one of:
  i. the on-chip memory if the RLC PDU to be retransmitted has been sent in a first layer 1 transport unit and belongs to an RLC Service Data Unit (SDU) comprising at least one further RLC PDU that has been sent in a second layer 1 transport unit, and
  ii. from the external memory if the RLC PDU to be retransmitted belongs to an RLC SDU that has been completely transmitted in the single layer 1 transport unit.

11. The layer 2 processing circuit chip of claim 10, wherein the layer 2 processor is configured to re-generate the RLC PDU to be retransmitted by applying at least one of a Packet Data Convergence Protocol PDCP function and an RLC function to the data racket read from the external memory.

12. The layer 2 processing circuit chip of claim 10, wherein the layer 2 processor is configured to re-generate the RLC PDU to be retransmitted by applying at least one of a ciphering function, an RLC header generation function and a Packet. Data Convergence Protocol (PDCP) header generation function to the data packet read from the external memory.

* * * * *